United States Patent [19]

Levings, Jr. et al.

[11] Patent Number: 4,497,524
[45] Date of Patent: Feb. 5, 1985

[54] KNOCK-DOWN FURNITURE ASSEMBLY

[76] Inventors: Nelson Levings, Jr., P.O. Box 204, Palos Park, Ill. 60464; Donald J. Evans, deceased, late of Naperville, Ill.; by Stephen G. Evans, administrator, Westhaven, Ill.

[21] Appl. No.: 430,669

[22] Filed: Sep. 30, 1982

[51] Int. Cl.³ .................. A47B 47/04; F16B 12/14
[52] U.S. Cl. .................. 312/265; 312/257 R; 411/378
[58] Field of Search .................. 312/257 A, 265, 264, 312/257 R, 111; 108/111, 156; 211/182; 248/188; 411/378

[56] References Cited

U.S. PATENT DOCUMENTS

| 868,310 | 10/1907 | White et al. | 312/265 |
|---|---|---|---|
| 926,230 | 6/1909 | Avery | 312/265 |
| 1,194,436 | 8/1916 | Smith | 312/265 |
| 1,508,259 | 9/1924 | Stafford | 312/265 |
| 2,501,980 | 3/1950 | Wolfe | 312/265 |
| 2,636,797 | 4/1953 | Alheit | 312/265 |
| 2,701,398 | 2/1955 | Bohmer | 411/378 |
| 2,987,362 | 6/1961 | Bernath | 312/257 R |
| 3,885,845 | 5/1975 | Krieks | 312/265 |
| 3,936,111 | 2/1976 | Mazzucconi | 312/257 R |
| 4,232,920 | 11/1980 | Bukaitz | 312/257 R |

FOREIGN PATENT DOCUMENTS

| 268134 | 8/1963 | Australia | 211/182 |
|---|---|---|---|
| 1293283 | 4/1962 | France | 248/188 |
| 384183 | 7/1960 | Switzerland | 411/378 |

Primary Examiner—William E. Lyddane
Assistant Examiner—Thomas A. Rendos
Attorney, Agent, or Firm—Trexler, Bushnell & Wolters, Ltd.

[57] ABSTRACT

A knock-down furniture assembly comprises substantially identical top frame and bottom frame members. Fasteners are coupled to the top and bottom frame members a side wall member rotatably receives an elongate mating fastener extending substantially from top to bottom thereof. The elongate mating fastener is configured for mating with the respective fasteners of both top and bottom frame members for defining an assembled condition of the furniture assembly. A knock-down drawer assembly comprises an end panel and two complimentary side panels and hinges for hingedly joining the complimentary side panels with the end panel. A preformed drawer guide assembly is also provided for mounting one or more assembled drawer to the assembled frames and sides of the furniture assembly.

24 Claims, 22 Drawing Figures

U.S. Patent  Feb. 5, 1985  Sheet 1 of 6  4,497,524
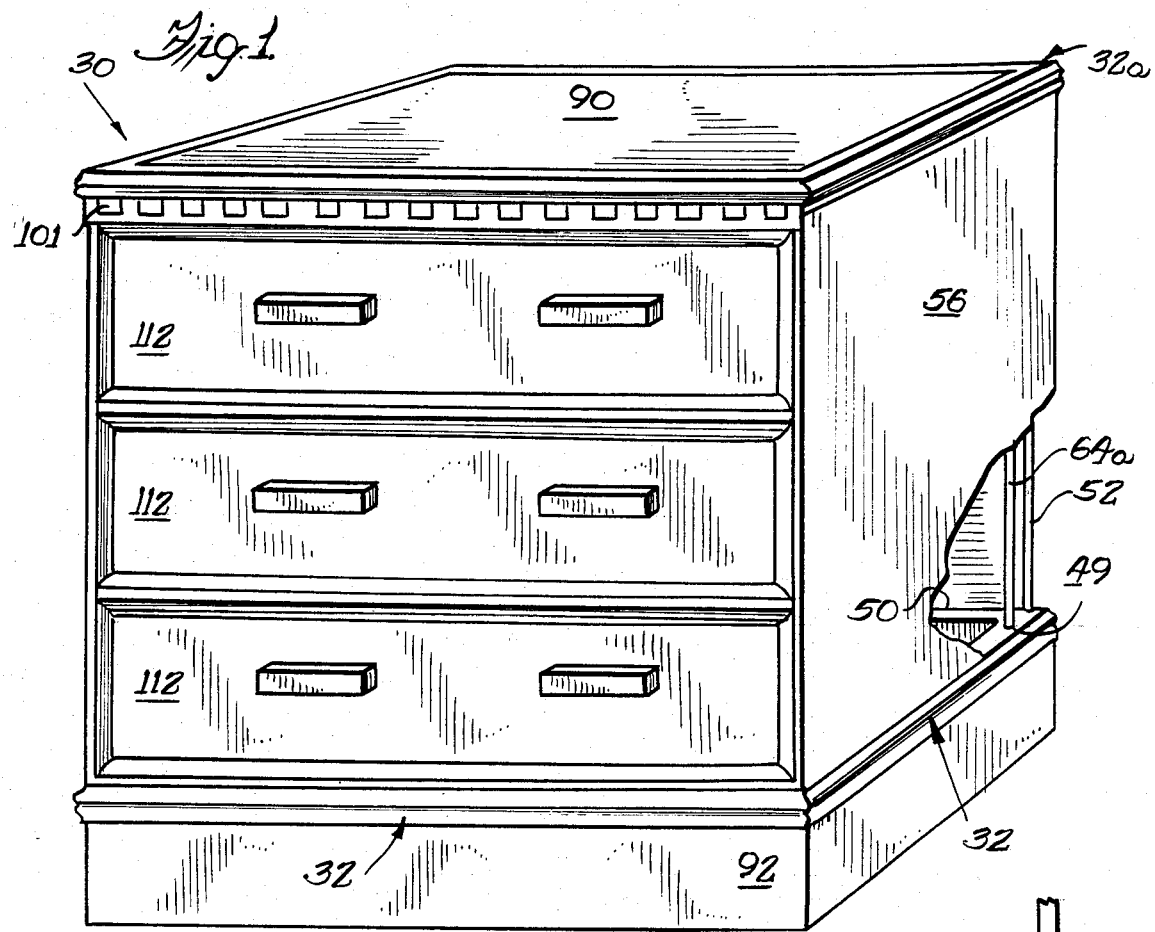
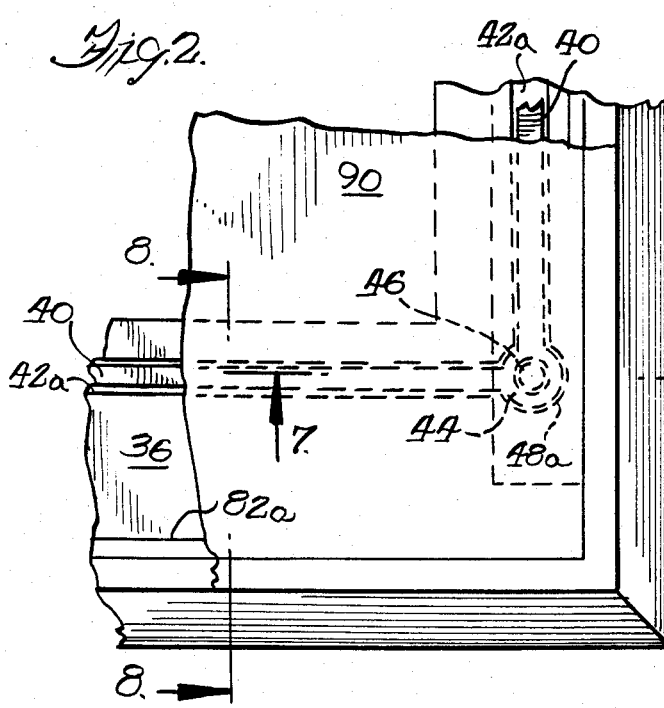
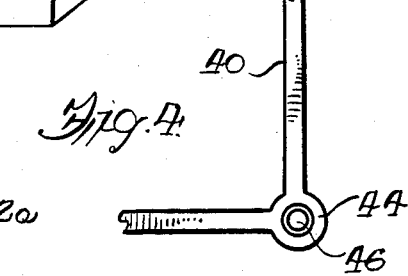
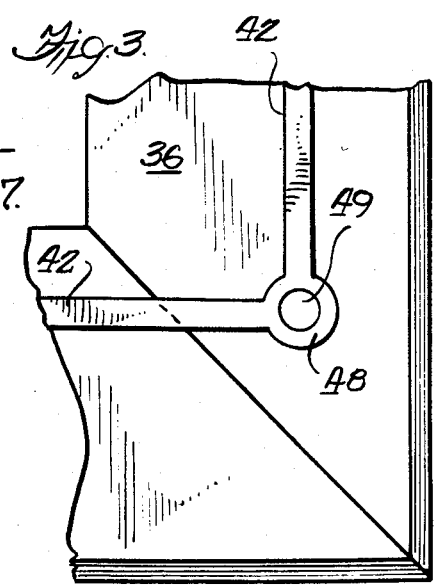

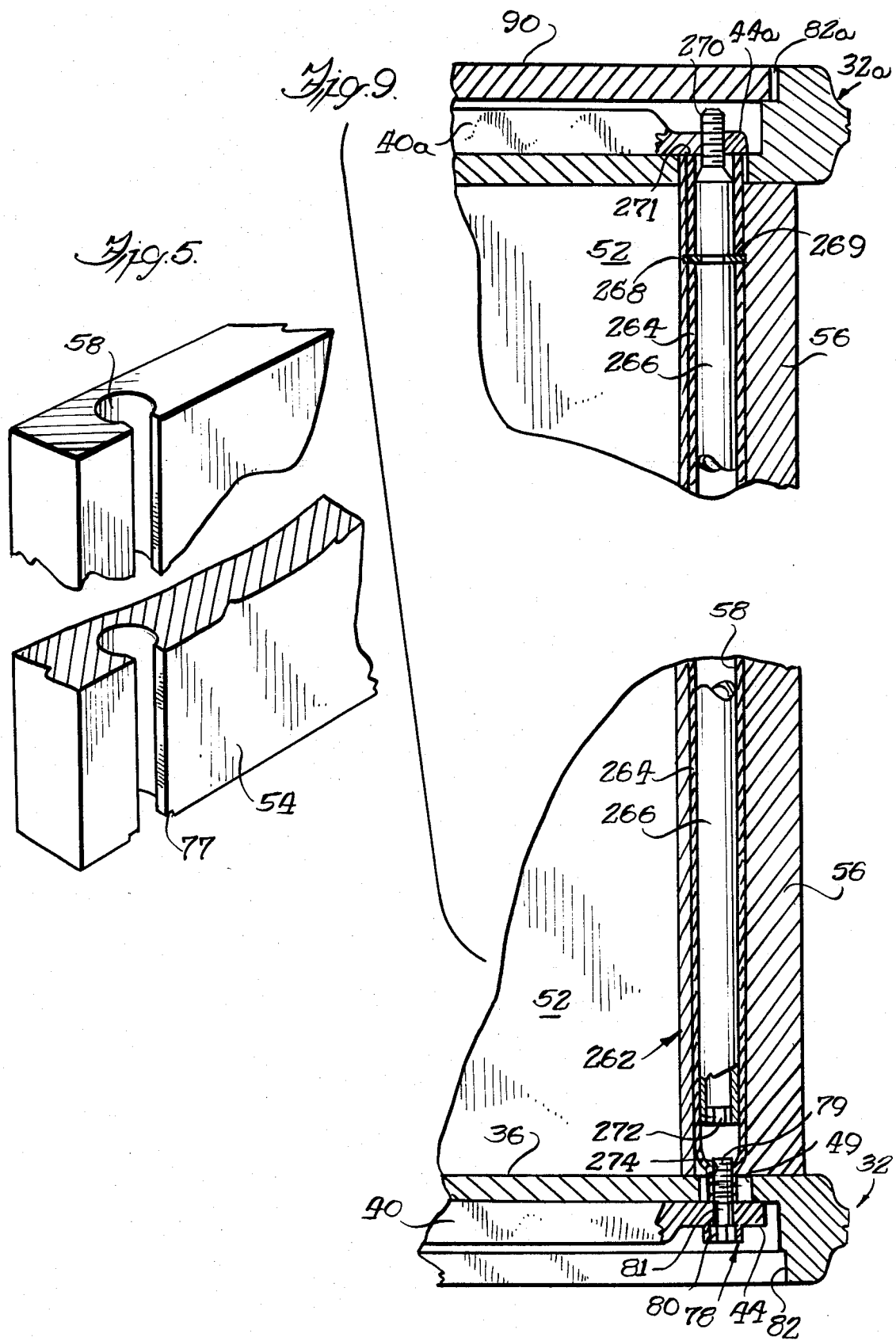

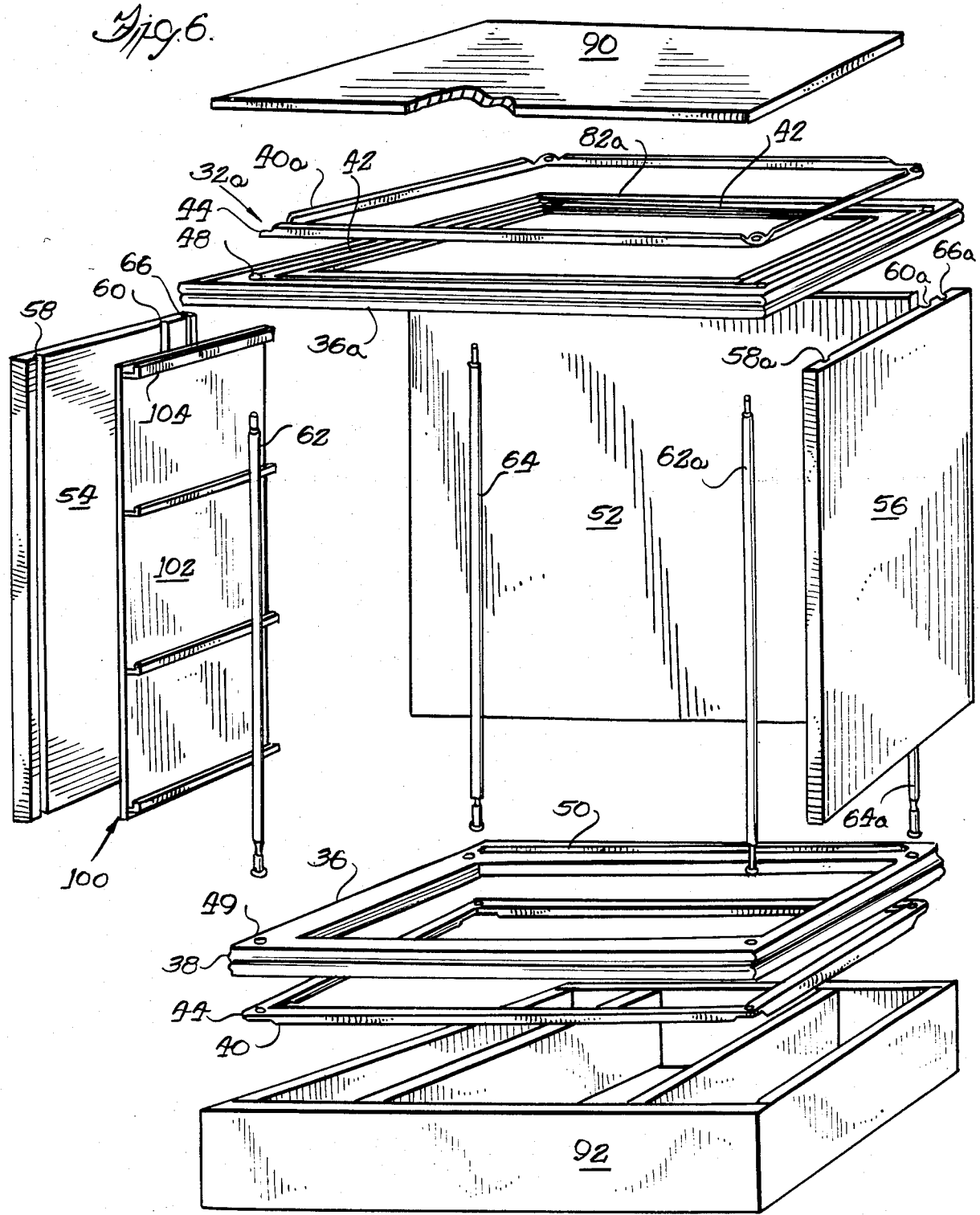

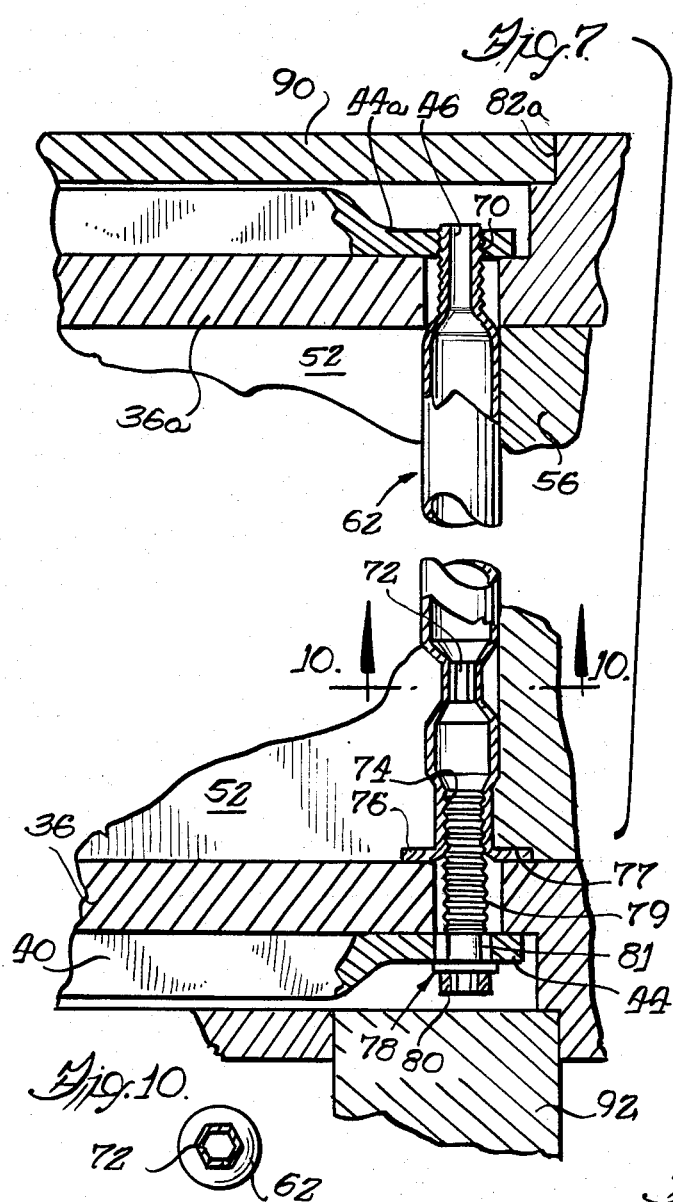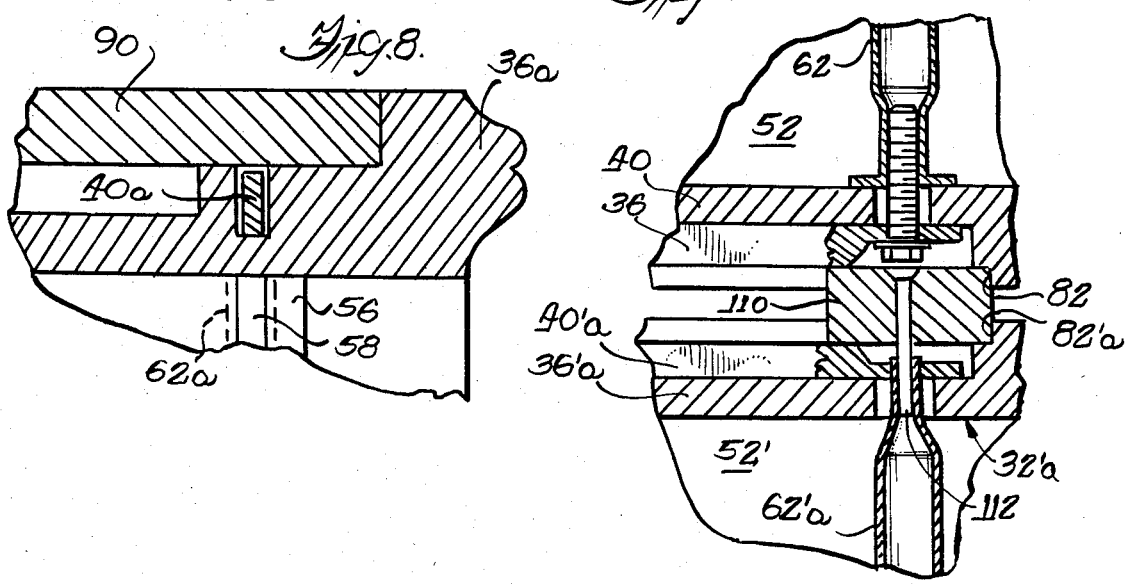

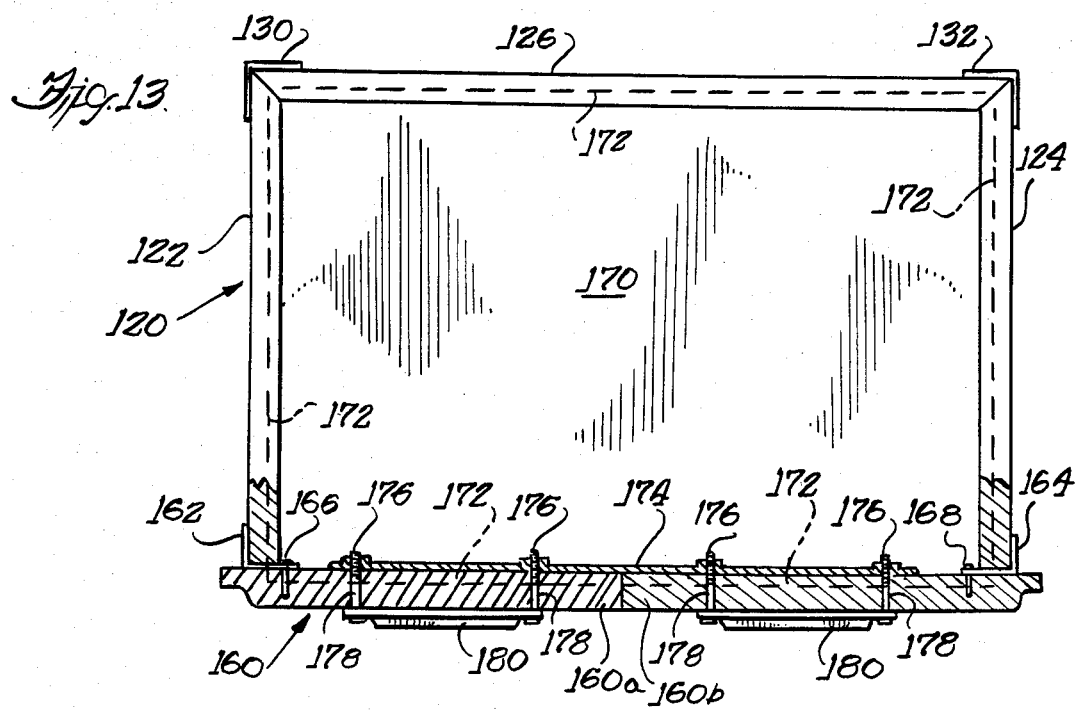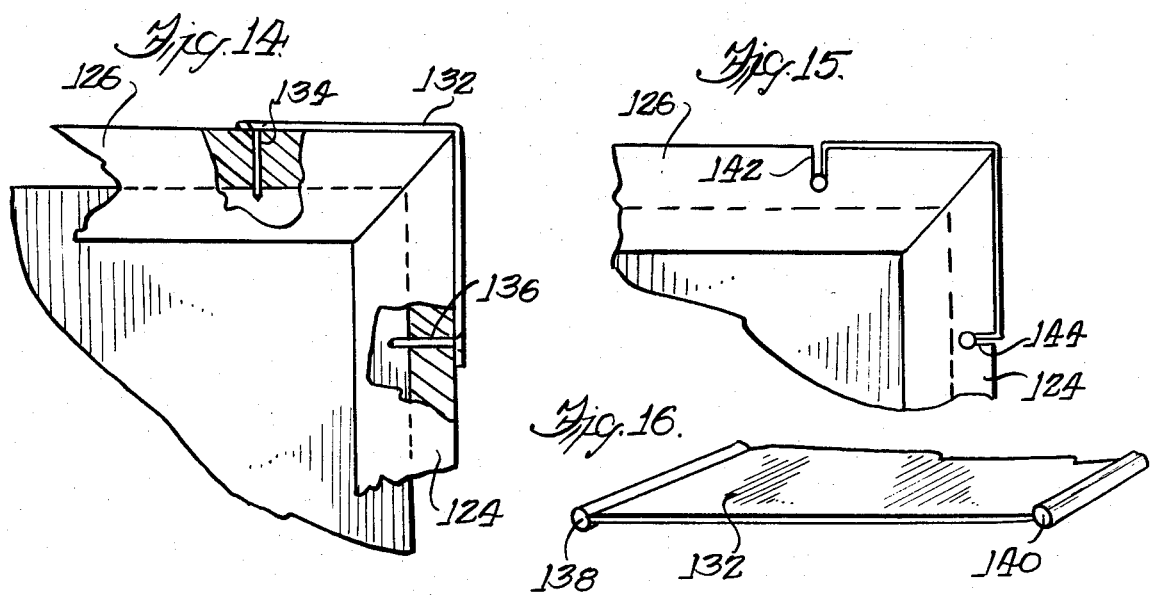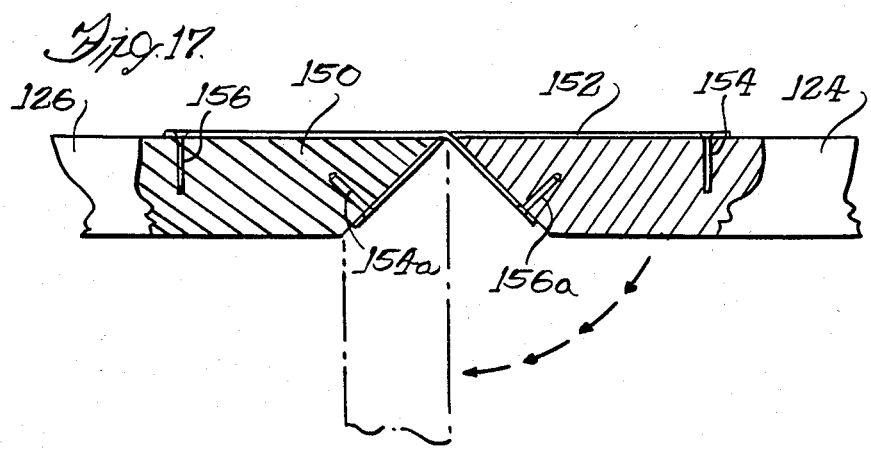

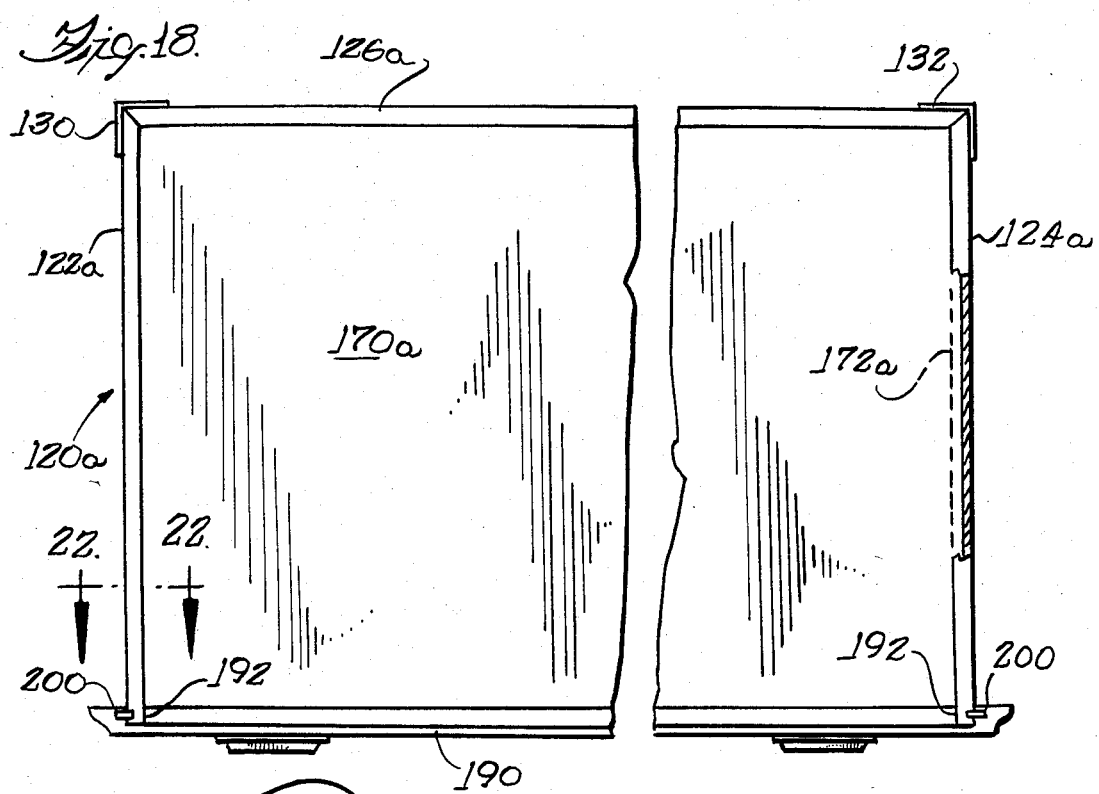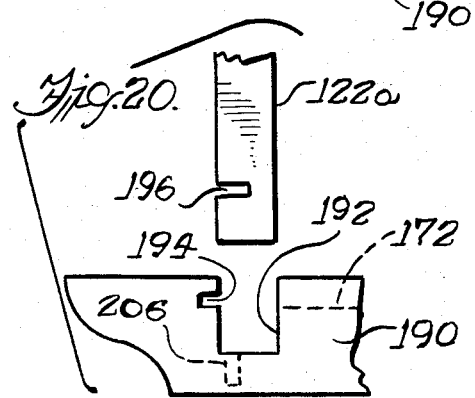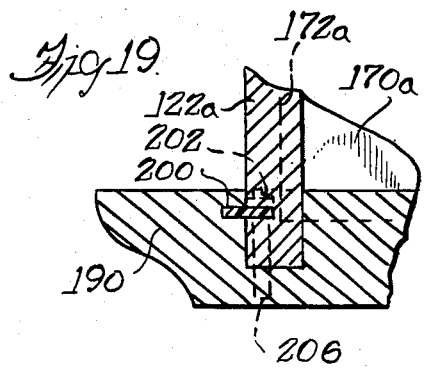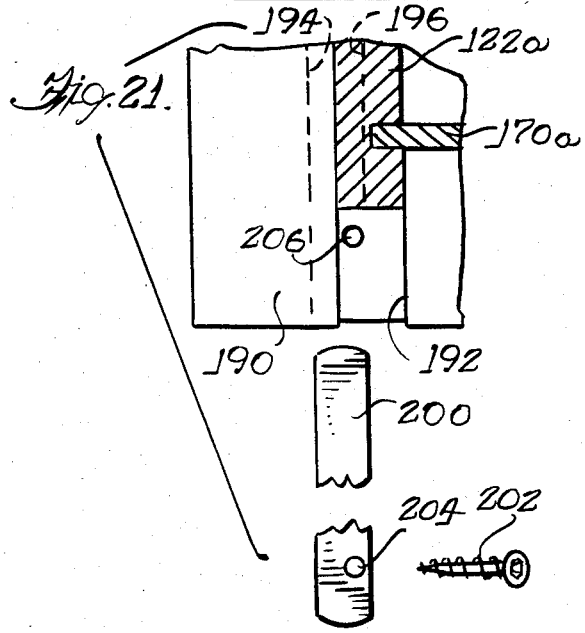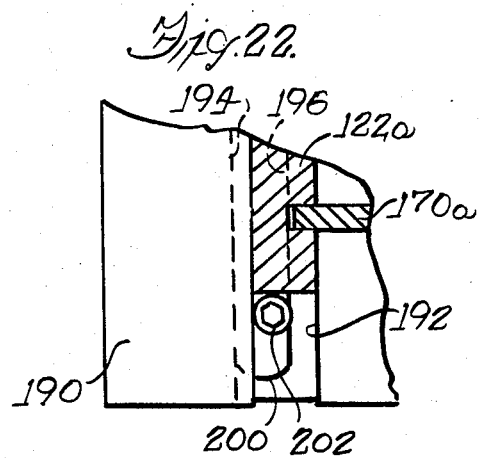

KNOCK-DOWN FURNITURE ASSEMBLY

BACKGROUND OF THE INVENTION

The present invention is directed generally to the furniture art and more particularly to a novel knock-down furniture assembly and the novel components thereof.

Heretofore, available types of furniture have fallen generally into two categories. A first type of furniture, which is provided to the consumer completely assembled by traditional glueing, doweling, and like procedures has become increasingly expensive to produce. Less expensive varieties of knock-down or disassembled furniture have also become available. However, this latter type of furniture has often proven relatively difficult for the relatively unskilled consumer to assemble. In this regard, such unassembled furniture has generally comprised an often confusing plurality of parts which must be assembled utilizing a plurality of different fasteners and mating tools. The consumer may encounter difficulty should any of the necessary fastener components be inadvertently omitted in the packaging of the unassembled furniture. Moreover, the consumer often encounters confusion in the selection of proper fasteners in following the various assembly steps and moreover may lack the appropriate tools for effecting assembly.

Even in cases where assembly has been greatly simplified, unassembled furniture heretofore provided may lack structural integrity and rigidity. Moreover, such unassembled furniture heretofore provided has generally been of a relatively inexpensive variety, often employing inexpensive fibre board and vinyl veneer covering. Such materials generally detract from the appearance of the furniture once assembled as compared to the appearance of traditional assembled furniture. Moreover, such materials inherently lack the structural integrity and rigidity of more traditional hardwoods generally utilized in more expensive furnishings. In this regard, unassembled furniture heretofore provided has generally lacked the variety and selection available in more traditional assembled furniture.

In spite of the foregoing drawbacks, unassembled furniture has a number of advantages over pre-assembled furniture including decrease in production costs to the manufacturer, resulting in part from the elimination of assembly costs and in part from the selection of relatively inexpensive materials. These cost savings can in large part be passed on to the consumer. Moreover, shipping costs are greatly decreased as unassembled furniture may be packaged more densely in less bulky containers as compared to assembled furniture. By the same token, warehousing space may be optimized due to the less bulky packaging requirements. The decreased bulk of the packaging also enables customer pick-up of the unassembled furniture directly from the warehouse or drop shipment to the consumer from the warehouse, eliminating many if not all of conventional delivery expenses of both dealer and consumer.

Heretofore there has been a lack of unassembled furniture which while maintaining most if not all of the foregoing advantages also eliminates most if not all of the foregoing disadvantages.

OBJECTS AND SUMMARY OF THE INVENTION

Accordingly, it is a general object of this invention to provide a novel and improved unassembled or knock-down type of furniture construction.

A related object is to provide such a knock-down furniture construction which substantially retains the above-mentioned advantages of unassembled furniture while substantially avoiding the foregoing disadvantages.

A further object is to provide a knock-down furniture assembly in accordance with the foregoing objects which is relatively simple and inexpensive in both manufacture and assembly and yet both attractive and highly durable once assembled.

A related object is to provide a modular furniture assembly in accordance with the foregoing objects which may readily be provided in a wide variety of materials and stylings with little or no modification of basic components thereof, which are standardized for use over a wide variety of configurations.

It is a further object of the invention to provide novel and improved standardized components which are few in number and can readily be assembled even by a relatively unskilled consumer utilizing but a single inexpensive tool which may be provided inexpensively packaged with the furniture assembly.

Briefly, and in accordance with the foregoing objects, a knock-down furniture assembly in accordance with one aspect of the invention comprises substantially identical top frame and bottom frame members each comprising means defining a frame and fastener means coupled to said frame and at least one side wall member including means for rotatably receiving elongate mating fastener means extending substantially from top to bottom of said side wall member, said mating fastener means being configured for mating with the respective fastener means of both said top and bottom frame members for defining an assembled condition of said furniture assembly.

In accordance with another aspect of the invention, there is provided a knock-down drawer assembly for furniture comprising at least an end panel and two complimentary side panels and hinge means for hingedly joining said complimentary side panels with said end panel.

In accordance with yet another aspect of the invention there is provided an elongate bi-ended fastener member comprising an elongate rod-like member having at one end thereof an externally threaded fastener portion defining a major thread diameter of a first dimension and at the other end thereof an internally threaded fastener portion defining a major thread diameter of a second dimension which is equal to or less than said first dimension and an intermediate rod-like portion joining the first and second fastener end portions.

The invention contemplates provision of the foregoing components both separately and in combination to form complete furniture assemblies.

BRIEF DESCRIPTION OF THE DRAWINGS

The foregoing as well as other objects, features and advantages of the invention will become more readily apparent upon considering the following detailed description of the illustrated embodiment, together with reference to the accompanying drawings:

FIG. 1 is a front perspective view of an assembled knock-down furniture assembly in accordance with this invention;

FIG. 2 is an enlarged view, partially broken away and partially in section illustrating a corner portion of the assembled furniture assembly of FIG. 1;

FIG. 3 is an enlarged plan view of a corner portion of a novel frame member of the assembly of FIG. 1;

FIG. 4 is a top plan view of a corner portion of a further frame member useful with the frame member of FIG. 3;

FIG. 5 a fragmentary perspective view of a side wall member of the assembly of FIG. 1;

FIG. 6 is an exploded perspective view illustrating the assembly of the components heretofore illustrated into the assembled state illustrated in FIG. 1;

FIG. 7 is a sectional view, partially broken away, taken generally along the line 7—7 of FIG. 2;

FIG. 8 is a sectional view, partially broken away, taken generally along the line 8—8 of FIG. 2;

FIG. 9 is a sectional view similar to FIG. 7 and illustrating an alternate embodiment of one aspect of the invention;

FIG. 10 is a sectional view taken generally along the line 10—10 of FIG. 7;

FIG. 11 is a fragmentary sectional view of a corner portion of the assembly of FIG. 1 illustrating stacking thereof on top of a similar furniture assembly;

FIG. 12 is a fragmentary sectional view taken along the left side of the furniture assembly of Fig. 1 and further illustrating a novel drawer guide arrangement in accordance with one feature of the invention;

FIG. 13 is a top plan view, partially in section, illustrating one form of a novel drawer assembly in accordance with another feature of the invention;

FIG. 14 is a top plan view, partially broken away and partially in section illustrating a novel arrangement for joining corners of a drawer in accordance with the invention;

FIG. 15 is a top plan view, similar to FIG. 14 illustrating an alternate method of joining corners of a drawer;

FIG. 16 a perspective view, partially broken away, of a joining member utilized in FIG. 15;

FIG. 17 is a top plan view, partially in section, illustrating yet another alternative method of joining corners of a drawer assembly in accordance with this invention;

FIG. 18 is a bottom plan view, partially broken away and partially in section illustrating a second form of drawer assembly in accordance with this invention;

FIG. 19 is a sectional view taken through a front corner of the drawer assembly of FIG. 18;

FIG. 20 a bottom view of end parts of a side and a front panel of the drawer of FIG. 18 illustrating assembly thereof in accordance with this invention;

FIG. 21 is a fragmentary rear elevation of a corner of the drawer of FIG. 18, partially in section, further illustrating assembly of the drawer of FIG. 18;

FIG. 22 is a fragmentary view similar to FIG. 21 and taken generally along the line 22—22 of FIG. 18.

DETAILED DESCRIPTION OF THE ILLUSTRATED EMBODIMENT

Referring now to the drawings and initially to FIGS. 1 and 6, a knock-down or modular furniture assembly in accordance with one form of the invention is designated generally by the reference numeral 30. This assembly 30, as best viewed in FIG. 6 comprises a plurality of parts. In accordance with a feature of the invention, the number of parts utilized is surprisingly few and simple, to greatly facilitate assembly thereof even by the relatively unskilled consumer. Hence, advantageously the furniture assembly may be manufactured in the form of a plurality of standardized parts and packaged and shipped unassembled to a distributor or retailer. Hence, shipping and assembly costs are minimized, with the resultant savings passed on to distributor, retailer and consumer.

Referring again to FIG. 6, in the illustrated embodiment, a three-drawer type of assembly has been illustrated. However, this drawer type unit is illustrated for purposes of description only, and as will hereinafter be seen, the furniture assembly in accordance with the invention may be provided with shelves, doors, or in other configurations without departing from the invention.

In accordance with an important feature of the invention, interchangeable top and bottom frame members or assemblies designated generally 32 and 32a are provided. These frame members are substantially identical, and hence only one such frame member 32 will be described. Like reference numerals, together with the suffix a, designate like parts of the frame assembly 32a. The frame member or assembly 32 comprises a first frame member 36 of a non-metallic material. This material may be wood or a wood product or a plastics material, in accordance with the desired style and finish of the furniture. Moreover, various woods, either a hardwood or a softwood or even a wood product such as fibre board or the like may be utilized to form the frame member 36.

As also seen in FIGS. 2 and 3, this frame member 36 is substantially a rectangular frame-like member whose outwardly facing surfaces 38 are finished in a desired fashion in accordance with the finished appearance to be imparted to the furniture assembly 30. When constructed of wood or a wood-like product, this frame member 36 may be formed with conventional mitered joints as shown in FIG. 3. Advantageously, a second, metallic and preferably steel frame member 40 is also provided. This second frame member 40 is similarly a rectilinear frame-like member and is preferably fabricated from a rectangular bar stock or other rod-like metal material, as by welding or similar means. Advantageously, the first frame member 36 is provided with an elongate, rectangular recess or groove 42 in the surface thereof facing the second frame member 40 for receiving the metallic frame member 40, peferably in a relatively close or even press fit. Hence, the frame member 40 once assembled with the frame member 36 lends additional structural strength and rigidity to the composite frame assembly 32 formed thereby. Additional glueing or stapling may also be utilized to hold the frame member 40 securely in the grooves 42.

In accordance with another feature of the invention, a novel fastening arrangement is provided for coupling the frame assemblies 32, 32a to side wall members of the furniture assembly 30. In the illustrated embodiment fastener means are provided integrally with the metallic frame member 40 and preferably substantially at the respective corners thereof. In this regard, reference is also invited to FIG. 4 wherein one such corner fastener 44 of the metallic frame member 40 is illustrated. This corner fastener 44 is formed by deforming the metallic material of the frame member 40 by suitable means into a relatively broad flat surface. Thereafter, a through aperture 46 is drilled or otherwise formed in the deformed corner portion and this aperture 46 is further tapped with a suitable screw type thread. Similar fasteners are formed at all four corners of the metallic frame member 40 for interfitting with mating fasteners as will presently be seen. Cooperatively, and as best viewed in FIG. 3, corner portions 48 of the groove or recess 42 in the frame member 36 are enlarged and complimentarily shaped to receive the enlarged corner fastener portions 44 of the metallic frame member 40. Additionally these corner recesses 48 axially surround a through bore 49.

It is also within the scope of the invention to provide the frame members 36, 36a without the additional metallic or steel frame member 40. In this regard, if the material chosen for the frame members 36, 36a exhibits sufficient structural integrity, such as might be the case with hardwoods or like materials, the metallic or steel frame member 40 may not be required. However, suitable fasteners such as the fasteners 44 would be suitably affixed at spaced apart locations on the frame members 36 and 36a and preferably in recesses such as the recesses 48 substantially at the corner locations as illustrated in FIGS. 1 and 4.

From the foregoing description, it will be appreciated that both top and bottom frame assemblies 32 and 32a are substantially identical, though as illustrated in FIG. 6, they are oriented in oppositely facing directions for effecting the furniture assembly of the illustrated embodiment. Additionally, both top and bottom frame members 36 preferably include suitable inwardly facing elongate grooves or slots 50 along rear edges thereof receiving respective top and bottom edges of a rectangular back panel 52.

A pair of substantially identical side panels 54 and 56 as illustrated in FIG. 6 will be seen to comprise substantially rectangular flat panels. In accordance with a feature of the invention the two side panels 54, 56 are substantially identical and therefore interchangeable. The panel 54 will be described, it being understood that the panel 56 is identical, like parts thereof being designated by like reference numerals with the suffix a. The panel 54 includes a pair of longitudinal through slots 58 and 60 which are spaced apart by substantially the same distance as the spacing between the fasteners 44 provided at the respective corners of the assembled frames 32 and 32a. Advantageously, corresponding elongate rod-like fasteners 62, 64 (62a, 64a) may be interfitted with each of these slots or grooves 58 and 60 to effect assembly of the side panels 54 and 56 with the pre-assembled top and bottom frame members 32 and 32a, as will presently be seen. Additionally, side panel 54 preferably includes an elongate groove 66 for receiving a side edge portion of the back panel 52.

The rod-like fasteners 62 and 64 are four in number, two each being provided for each of the side panels 54 and 56, to interfit with the slots or grooves 58 and 60 thereon as described. In this regard, referring briefly to FIG. 5, one such slot or groove 58 of the side panel 54 is illustrated. It will be seen that this slot or groove 58 is substantially key-hole shaped for greatly simplifying the formation thereof in the panel 54 while positively retaining the corresponding rod 62 which is slideably inserted therewithin.

It will be seen from the foregoing that assembling the parts heretofore described is relatively simple. In this regard, the top frame member 32a is preferably laid upside-down on a suitable flat working surface. It will be appreciated that the metallic frame members 40 are preferably provided pre-assembled with the wood frame members 36 as by stapling, glueing or other suitable means once the metallic frame members 40 have been interfitted with the slots 42 provided therefor. Thereupon, one of the side panels 54, 56 may be aligned with the fasteners 44 provided at the respective corners of the frame assembly 32a, whereupon the elongate fasteners 62 and 64 may be slideably inserted therethrough and threadably coupled with the fasteners 44. In this regard, reference is also invited to FIG. 7 which illustrates the assembled relation of these parts in fragmentary section. It will be seen that the fasteners 62, 64 are tubular members. A first end of each tubular elongate fastener 62, 64 etc. is provided with an external thread 70 which mates with the internal thread 46 formed in the fastener portion 44.

While the threads 70 may be initially hand threaded into the engagement illustrated in FIG. 7, thereafter further tightening is preferably effected in accordance with a further novel feature of the invention. Referring also to FIG. 10 it will be seen that an interior portion of the elongate fastener 62 near the end thereof opposite the thread 70 is provided with an internal drive configuration which in the illustrated embodiment comprises an internal hex recess or slot 72. A suitable tool such as a hex or allen wrench may be readily interfitted into the as yet unoccupied end of the tubular fastener 62, for threadably advancing thread 70 and with respect to thread 46 as illustrated in FIG. 7.

The remaining end of each of the tubular elongate fasteners 62, 64, etc. is formed with an internal thread 74 and a flared out end portion 76 which has the inner surface of the bottom frame member 36 butted up thereagainst. Preferably a counter bore 77 in the end of each side panel 54, 56 (also shown in FIG. 5) receives this flared out portion 76. This defines full advancement of the thread 70 with respect to thread 46. A suitable fastener such as a machine screw 78 having a mating external thread may then be advanced through the fastener portion 44 at each corner of the frame assembly 32 and advanced with respect to the respective mating internal thread 74 of each of the tubular fasteners 62, 64, etc.

Reference is next invited to FIG. 9, wherein an alternate embodiment of the elongate, rod-like fasteners 62 and 64 is illustrated. FIG. 9 is a view substantially similar to FIG. 7, and like parts and components of the furniture assembly 30 are designated by like reference numerals. The elongate rod-like fastener member is generally designated by the reference numeral 262. In the embodiment illustrated in FIG. 9, this elongate fastener 262 comprises a composite member including a hollow elongate tubular member 264 which carries an elongate preferably solid rod member 266 in tension. A suitable retaining ring 268 is preferably placed around and through a suitable through aperture 269 as by brazing or welding to securely clamp the rod member 266 in place within the tube 264.

An outer end of the rod member 266 is formed with an external thread 270 for threadably engaging the internal thread of fastener 44a associated with the top frame member 32a. This thread 270 is substantially identical with the thread 70 described above with reference to FIG. 7. The opposite end of the rod member 266 is provided with an internal hex recess or slot 272. This hex recess or slot is substantially identical to the hex recess or slot 72 described above with reference to FIG. 7. Hence, in similar fashion, the threaded end 270 may be initially aligned with the fastener 44a, and the fastener member 262 initially hand rotated to effect engagement thereof. Thereafter, a suitable hex tool or allen wrench may be utilized to effect secure engagement of the respective threads of end 270 and fastener 44a. In this regard, it will be seen that full advancement of the thread 270 with respect to fastener 44a is defined when the adjacent end 271 of the tubular member 262 securely butts up against and engages the outer surface of the fastener portion 44a of the metallic frame member 40a.

The opposite end of the tubular member 264 is swaged or otherwise formed to a smaller diameter and tapped with an internal thread 274 which is substantially identical with internal thread 74 described above with reference to FIG. 7. This internal thread 274 threadably interfits with mating thread 79 of threaded fastener 78 described above. However, the tubular member 264 extends through the aperture 49 in frame member 36 to securely butt up against and engage the undersurface of the threaded fastener portion 44 of the metal frame 40. Hence, the tubular member 264 is not provided with a flange similar to the flange 76 described above with reference to the tubular fastener 62 of FIG. 7. Functionally, however, it will be seen that the arrangement of FIG. 9 is substantially equivalent to the arrangement of FIG. 7.

From the foregoing it will be seen that assembly of the two side panels 54 and 56 with the top frame assembly or member 32a may be effected by sequentially threadably engaging the leading end thread 70 (270) of each of the tubular fastener members 62, 62a and 64, 64a (262) with respective corner fasteners 44 in the same fashion. Thereafter, the bottom frame assembly or member 32 may be aligned over the opposite ends of the respective side panels 52, 54 and the respective corner fasteners 44 brought into alignment with respective ends of fasteners 62, 64, 62a and 64a (262). Then, the fasteners 78 are tightened to complete the assembly.

In accordance with a preferred form of the invention, the thread diameters of each of the fasteners described are substantially identical. That is, the thread diameters of the internal threads 46 and of the internal threads 74 or 274 are the same, while the external thread diameters of external threads 79 of the screw 78 and of the threaded end portion 70 or 270 of each tubular fastener 62, 64, etc. or 262 are also substantially identical. Hence, the hex head driver portion 72 or 272 is preferably formed to be of somewhat smaller cross-section than the minor thread diameter of the internal thread 74 or 274 to permit ingress of a suitable hex tool for rotating the tubular fastener 62 to achieve initial coupling with top frame 32a as already described.

Advantageously, a driver head portion 80 of the screw or bolt 78 is also provided with a hex configuration identical to the hex configuration 72, whereby a single tool may be utilized to effect assembly of the furniture as thus far described. In this regard it should be appreciated that the back panel 52 is slideably inserted in the respective slots 50 and 66 provided therefore in the side panels 54 and 56 and top frame member 32a prior to assembly of the bottom frame member 32 therewith as just described. Preferably, the fastener or screw 78 is also provided with an unthreaded shank portion 81 intermediate the driver head 80 and threaded shank portion 79 thereof. This unthreaded shank portion is of smaller diameter than the threaded shank portion 79. Accordingly, fasteners 78 may be provided pre-assembled in substantially captive relation to each of the corner fasteners 44 formed at respective corners of the bottom frame assembly 32.

The foregoing describes the structure and assembly of a basic furniture module comprising substantially identical top and bottom frame members, a pair of substantially identical side panels, and if desired, a suitable back panel. Other components illustrated in FIGS. 1 and 6 may be added thereto as desired to define a given furniture assembly such as a three-drawer chest as illustrated in FIG. 1.

In this latter regard, it will be seen that the edge portions of the frame members 36, 36a are stepped back laterally outwardly of and above the respective grooves 42 to form rims 82, 82a. These steps or rims 82, 82a are particularly advantageous for accepting and interfitting with a drop-in top panel 90 and with a bottom pedestal or base 92 as partially illustrated in FIG. 7 and as fully illustrated in FIGS. 1 and 6. Preferably both the top panel 90 and base member 92 are substantially rectangular for closely interfitting with the rims defined by the steps 82, 82a provided in both top and bottom frame members 36, 36a.

In order to complete the three-drawer chest assembly illustrated in FIG. 1, a pair of substantially identical drawer guide members or assemblies 100 may be suitably affixed to respective side panels 54 and 56 as further illustrated in FIG. 12 to which reference is also invited. A decorative front top dentil molding 101 may also be provided as shown in FIG. 1. The illustrated drawer guide assembly comprises a substantially rectangular, flat mounting panel 102 and a desired number of generally L-shaped elongate drawer guide members 104, 104a, 104b and 104c non-removably coupled to the panel 102. Suitable fasteners 106 generally at top and bottom portions of the panel 102 may be used to affix the panel 102 to the interior surface of each of the side wall members 54 and 56.

Reference is next invited to FIG. 11 wherein top and bottom corner portions of two assemblies similar to that illustrated in FIG. 1 are shown for purposes of illustrating a modular or stacking feature of the invention. In this regard, it will be appreciated that the outer rim or lip portions 82, 82a formed in the top and bottom frame assemblies 32, 32a may receive a suitable spacer block 110 therebetween to define a stacked arrangement. Additionally, a suitable pin 112 is preferably passed through the spacer block 110 and extends into and through the open upper end portion of the tubular or rod-like fastener member 62a associated with the lower furniture assembly.

Referring now to the remaining FIGS. 13 through 22 alternative embodiments of a novel drawer construction in accordance with another aspect of the invention will be described. In this regard, the drawers 112 of FIG. 1 are all substantially identical, whereby only one drawer construction need be described in connection with each embodiment. Referring initially to FIG. 13, a first embodiment of a drawer construction is indicated generally by the reference numeral 120. Advantageously, the drawer 120, in similar fashion to the furniture assembly 30 is provided in knock-down form, for ease in shipment and assembly.

In this regard, in the embodiment shown in FIG. 13 the drawer 120 includes sustantially identical side panels 122, 124 and a back panel 126. Advantageously, the back panel 126 is joined at mitered outer ends with respective mitered ends of the two side panels 122 and 124 by a hinge-type connection. This hinge-type connection might take one of several forms, as further illustrated in FIGS. 14–17. As shown in FIG. 13, the hinge-like connections comprise respective strips 130 and 132 of a fabric or other cloth-like flexible material.

Preferably, this fabric or cloth-like material comprises a reinforced cloth material, such as one with metal threads woven into the fabric. Other suitable relatively strong cloth or fabric materials or plastics materials may also be utilized. In the embodiment illustrated in FIG. 13, these cloth hinge members 130 and 132 are fastened to respective outer surfaces of the back panel 126 and side panels 122, 124 by glueing. The glueing may take the form of a suitable adhesive applied intermediate the surfaces of respective panels 122, 124 and 126 and facing surfaces of the cloth hinge connectors 130 and 132. Alternatively, the strips 130, 132 may be impregnated with a suitable "hot melt" type of adhesive.

Referring now to FIG. 14, suitable fasteners such as nails 134, 136 may also be utilized to attach the fabric hinge members 130, 132. These fasteners or nails 134, 136 are preferably utilized in addition to the glueing just described.

An alternative arrangement is illustrated in FIGS. 15 and 16 wherein the fabric strips 130, 132 are each provided with a pair of tongue or dowel members 138 and 140 non-removably attached by suitable means to respective ends thereof. Cooperatively, as shown in FIG. 15, suitable keys or grooves 142, 144 are provided in respective end parts of the back panel 126 and side panel 124 to slideably accept the respective tongues or dowels 138 and 140. Preferably, a suitable glue material is also utilized to hold the respective tongues or dowels 138 and 140 in place in their respective grooves or key slots 142 and 144.

Referring breifly to FIG. 17 yet another alternative arrangement of the hinge connection is illustrated. Here, a plurality of strips of fabric material 150, 152 of relatively lesser breadth or width are arranged in "criss-cross" fashion and attached between respective outer and inner mitered surfaces of the respective side and end panels 124, 126. The attachment of the strips 150 and 152 may be by glueing as described above or additionally by the use of suitable fasteners such as nails, 154, 154a and 156, 156a.

Referring again to FIG. 13, a drawer front or panel 160 is provided in the form of two portions or halves 160a and 160b. These respective front portions or halves 160a and 160b are preferably affixed at their outer ends to facing or front end parts of the respective side panels 122 and 124 by a pair of further similar fabric strip hinge-like connectors 162 and 164. Preferably, these hinge-like strips 162 and 164 are coupled as by glueing, intermediate respective outer end surfaces the side panels 122 and 124 and inner end surfaces of the respective drawer front portions 160a and 160b. Additionally, suitable fasteners such as nails, 166, 168 may be utilized to complete the coupling of these strips 162 and 164 with the respective drawer front panels 160a and 160b.

A suitable flat bottom panel 170 is also provided and is preferably interfitted with respective side panels 122, 124, end panel 126 and front panel portions 160a and 160b by the provision of suitable grooves 172 therein, which are shown in dashed line. These grooves 172 are sized to accept respective edge portions of the bottom panel 170.

In accordance with a further feature of the invention, it will be seen that the drawer assembly of FIG. 13 is provided essentially as a pre-assembled, hingedly connected assembly comprising back panel 126, side panels 122 and 124 and front portions 160a and 160b. The bottom panel 170 which is separately provided may be readily interfitted upon assembly with the remaining parts by slideably inserting edge portions thereof into respective receiving grooves 172 of the back and side panels and thereafter hingedly closing front portions 160a, 160b about the front edge of the bottom panel 170 to form the assembly illustrated in FIG. 13.

The assembly of FIG. 13 is then completed by the use of an elongate rigid strap member 174, preferably of a metallic material which overlies the inner back surface of the respective front panel portions 160a and 160b. Preferably, this strap 174 is provided with a plurality of spaced apart through openings 176 for accepting suitable fasteners 178 to complete the assembly. In the illustrated embodiment, these fasteners 178 comprise threaded fasteners or screws, whereby the openings or apertures 176 are tapped with a suitable complimentary thread. Additionally, the fasteners 178 are preferably utilized to attach suitable drawer pulls 180 to the drawer front while simultaneously coupling the strap 174 to the back surface thereof.

Reference is next invited to FIGS. 18 through 22 wherein an alternative form of drawer assembly 120a is illustrated. This drawer assembly 120a utilizes a number of parts similar to those described with reference to the assembly of FIG. 13, whereby like reference numerals together with the suffix a will be utilized to describe like parts. In this regard, the drawer assembly 120a comprises a pair of similar side panels 122a and 124a and a back panel 126a which are hingedly joined by similar fabric or cloth type strips 130a and 132a in the same fashion described above with reference to FIG. 13, or alternatively as described with reference to FIGS. 14 through 17. A similar bottom panel 170a is also provided and suitable grooves 172a are formed and side panels 122a and 124a and back panel 126a for accepting complimentary edge parts of the bottom panel 170a.

Departing from the embodiment of FIG. 13, a drawer front 190 is provided as a single piece construction. Hence, the drawer front 190 is coupled with respective leading ends of the side panels 122a and 124a by an alternate arrangement. Referring initially to FIG. 20, the front panel 190 will be seen to be provided with a similar groove 172a for accepting an edge part of the bottom panel 170a. Additionally, vertically oriented recesses, grooves or slots 192 are provided in outer ends of the drawer front 190 for accepting leading edge parts of respective side panels 122a and 124a. Hence, the grooves or slots 192 are generally complimentary in shape with the end parts of the respective side panels 122a and 124a. Referring now also to FIGS. 19 through 22, the assembly is completed by the provision of a novel tongue and groove or key and key slot arrangement.

In this regard, facing grooves or slots 194 and 196 are formed respectively at an outer edge of the groove or slot 192 and at a facing outer edge surface of the side panel 122a. These grooves or slots 194 and 196 are suitably positioned so that they come into alignment to form a composite key slots or grooves upon assembly of the side panels 122a, 124a with the drawer front 190 as above described. In this regard, the slot or groove 196 preferably runs from top to bottom of the side panel 122a. However, the complimentary groove or slot 194 runs substantially co-extensively with the groove or slot 192 in the drawer front 190 that is, these two slots or grooves 196 and 194 run from the bottom surface of the drawer front 190 to a point interiorally thereof somewhat short of the top surface, to define an assembled condition of the drawer as shown in FIG. 18.

A suitable mating tongue or key 200 is slideably insertable into the aligned key slots or grooves 194 and 196. Preferably, this key 200 comprises a relatively thin, flat elongate strip of metallic material. However, the key 200 may be formed of other materials without departing from the invention. In order to hold the key or strip 200 in place, once slideably inserted through the grooves or slots 194 and 196, a suitable fastener 202 is provided.

In the illustrated embodiment, the fastener 202 preferably comprises a screw-type fastener and a receiving through aperture 204 is provided for receiving the fastener 202 in a bottom portion of the strip or key 200. An additional aligned pilot hole 206 is also provided in a bottom portion of the interior of the groove or slot 192 of the drawer front 190. Preferably the fastener 202 comprises a threaded fastener with a wood screw-type thread for threadably engaging the pilot hole 206 and hence holding the assembled key and key-slot arrangement in assembled condition as illustrated in FIGS. 19 and 22.

From the foregoing, it will be seen that assembly of the drawer 120a is relatively simple. The pre-assembled hingedly joined side and back panels are first assembled with the bottom panel 170a by aligning the grooves 172a thereof with the edge parts of the bottom panel 170a. Thereafter, the front panel 190 is also slideably affixed to the front edge portion of bottom panel 170a by alignment with its complimentary slot or elongate groove 172a. At the same time, the respective slots 192 at either side of the drawer front 190 are aligned with and slideably interfitted with the facing edge parts of the respective side panels 122a and 124a. Once the respective composite key slots formed by additional grooves 194 and 196 are in alignment, respective key or tongue pieces 200 may be slideably inserted from the bottom surface of the drawer assembly 120a. Finally, the respective fasteners 202 are inserted through respective openings 204 and advanced into the pilot holes 206.

In this regard, the fastener or screw 202 is preferably provided with a hex-slot driver head portion, whereby the same hex or allen wrench tool mentioned above with respect to assembly of the furniture assembly shown in Figs, 1 through 10 may be utilized. Hence, advantageously, the purchaser needs but a single tool which may be advantageously and inexpensively provided with the furniture assembly for completing the assembly of the furniture construction including the drawers as illustrated in FIGS. 17 through 21.

What has been illustrated and described herein is a novel and improved knock-down or modular furniture construction or assembly. Advantageously, the assembly may be provided in many configurations, while utilizing relatively few and simple standardized parts to form basic components thereof. The knock-down arrangement permits greater density of packaging for shipping, as well as saving on required storage space for warehousing furniture by the dealer. Additionally, the customer may readily pick up the assembly directly from the dealer's warehouse.

Since the basic parts illustrated and described herein are essentially interchangeable from one piece of furniture to the next, any missing or inadvertently damaged parts may readily be obtained by the customer direct from the warehouse. Moreover, the cost of stocking such parts is greatly simplified due to the relatively small number and interchangeability thereof. Since the cost of furniture assembly to the manufacturer and dealer is minimized, great cost savings may be realized by manufacturer and dealer and ultimately by the consumer, without sacrificing the quality or integrity of the product.

While preferred embodiments have been illustrated and described herein, the invention is not limited thereto. Those skilled in the art may devise various alternatives, changes and modifications upon reading the foregoing description. The invention includes such changes, alternatives and modifications insofar as they fall within the spirit and scope of the appended claims.

The invention is claimed as follows:

1. A knock-down furniture assembly comprising: substantially similar top frame and bottom frame members each comprising means defining a frame and at least one fastener means coupled to said frame and at least one side wall member including means for rotatably receiving elongate mating fastener means extending from top to bottom of said side wall member for mating with the respective fastener means of both said top and bottom frame members for assembling said top and bottom frame members to said side wall member to define an assembled state of said knock-down furniture assembly; wherein each said elongate mating fastener means comprises an elongate rod-like member having at one end thereof an externally threaded fastener portion defining a major thread diameter of a first dimension and at the opposite end thereof an internally threaded fastener portion defining a major thread diameter of a second dimension which is equal to or less than said first dimension and an intermediate rod-like portion joining said first and second end portions; each said elongate mating fastener means further including driver means formed at a bottom portion of said internally threaded portion thereof and dimensioned for receiving a tool of lesser cross-sectional dimension thatn the minor thread diameter of said internally threaded portion for rotating said rod-like member to achieve threadable advancement of said externally threaded end thereof with respect to he aligned fastener means of one of said top and bottom frame members.

2. A knock-down furniture assembly according to claim 1, wherein said top frame and bottom frame members are substantially identical and each is rectilinear in configuration and includes plurality of slot means located at spaced apart locations thereon, each said slot means for receiving one said fastener means.

3. A knock-down furniture assembly according to claim 2, wherein said side wall members are two in number and substantially rectilinear in configuration, one dimension thereof being complimentary to one dimension of each of said top frame and bottom frame members for interfitting therewith, said side frame members each including spaced apart top to bottom openings alignable with said fastener means at said spaced apart locations of said top frame and bottom frame members respectively for rotatably receiving said elongate mating fastener means.

4. A knock-down furniture assembly according to claim 1, and further including guide means for slidably receiving and guiding at least one drawer forming a part of said knock-down furniture assembly.

5. A knock-down furniture assembly according to claim 4 wherein said at least one drawer comprises a front panel, an end panel and two similar complimentary side panels and hinge means hingedly joining respective first ends of said complimentary side panels with said end panel and joining means for joining said front panel with said side panels at ends thereof opposite the first ends thereof.

6. A knock-down furniture assembly according to claim 5, wherein said joining means comprises spaced apart slot means in a side of said front panel facing said end panel and complimentarily dimensioned for receiving end portions of said side panels respectively, key means, and complimentary slot means in said front panel and said side panel end portions respectively for removably receiving said key means for maintaining said drawer in assembled condition.

7. A knock-down furniture assembly according to claim 5, or claim 6, and further including a substantially flat, plate-like bottom panel and groove means formed in said end panel, said front panel and said side panels respectively for alignment with edge parts of said bottom panel for receiving said edge parts of said bottom panel therewithin.

8. A knock-down furniture assembly according to claim 6, wherein said slot means in said front panel comprise a pair of spaced apart slots of similar dimensions to the cross-sectional dimensions of said side panel end portions for removably receiving said side panel end portions.

9. A knock-down furniture assembly according to claim 8, wherein said key means comprise flat elongate strips, and wherein said complimentary slot means comprise first slots in the respective end parts of said side panels and second slots communicating with said slot means in said front panel and alignable with the respective first slot means to define composite slots each complimentarily dimensioned for respectively receiving one of said flat elongate strips.

10. A knock-down furniture assembly according to claim 9, and further including fastener means and means in said key means and said front panel respectively for receiving said fastener means for retaining said key means in the respective complimentary composite slots, thereby maintaining said drawer in assembled condition.

11. A knock-down furniture assembly according to claim 11 wherein said hinge means comprises a pair of strips of flexible material respectively non-removably joined with adjacent end parts of said end panel and of the respective side panels to define respective hinge-like connections therebetween.

12. a knock-down furniture assembly according to claim 5 wherein said front panel comprises a pair of complimentary front panel portions together defining a drawer front and second hinge means respectively hingedly joining said front panel portions with respective end parts of said side panels.

13. A knock-down furniture assembly according to claim 12, and further including rigid elongate strap means for coupling said two front panel portions together to define said drawer front.

14. A knock-down furniture assembly according to claim 12, wherein said first and second hinge means comprise respective flexible strips of material respectively non-removably jointed with adjacent end parts of said end panel and the respective side panels and with adjacent end parts of said front panel portions and said side panels to define respective hinge-like connections between said end panel and said side panels and between said front panel portions and said side panels respectively.

15. A knock-down furniture assembly according to claim 1, wherein said top frame and bottom frame members are substantially identical, each comprising a substantially rectilinear frame-like member of a non-metallic material, a substantially rectilinear second frame-like member of a metallic material and means in said first frame-like member for receiving said second frame-like member coupled therewith to provide a rigid, substantially non-deformable composite frame.

16. A knock-down furniture assembly according to claim 15, wherein said second, metallic frame-like member further includes said fastener means non-removably coupled thereto at spaced apart locations thereupon.

17. A knock-down furniture assembly according to claim 16, wherein said means for receiving said second frame member comprises elongate slot means in said first frame member defining dimensions substantially complimentary with said second frame member and said spaced apart fastener means thereupon for receiving the second frame-like member and fastener means substantially embedded within said first frame-like member, with at least said fastener means exposed for mating engagement with said elongate mating fastener means.

18. A knock-down furniture assembly according to claim 17, wherein said fastener means are disposed substantially at respective corners of said rectilinear metallic frame-like member and comprise internally threaded fasteners.

19. A knock-down furniture assembly according to claim 1 wherein each of said frame members comprises a substantially rectilinear frame-like member of a non-metallic material, a substantially rectilinear second frame-like member of a metallic material and means in said first frame-like member for receiving said second frame-like member coupled therewith to provide a rigid, subtantially non-deformable composite frame.

20. A knock-down furniture assembly according to claim 19 wherein said second, metallic frame-like member further includes a plurality of fasteners comprising said fastener means non-removably coupled thereto at spaced apart locations thereupon.

21. A knock-down furniture assembly according to claim 20, wherein said means for receiving said second frame member comprises elongate slot means in said first frame member defining dimensions substantially complimentary with said second frame member and said spaced apart fasteners thereupon for receiving the second frame-like member and fastener substantially embedded within said first frame-like member, with at least said fasteners exposed for mating engagement with said mating fastener means.

22. A knock-down furniture assembly according to claim 21 wherein said fasteners are disposed substantially at respective corners of said rectilinear metallic frame-like member and comprise internally threaded fasteners.

23. A knock-down furniture assembly according to claim 1 wherein said elongate mating fastener means comprises a tubular member.

24. A knock-down furniture assembly according to claim 23 wherein said elongate mating fastener means further includes a solid rod non-rotatably carried in said tubular member.

* * * * *